(12) United States Patent
Iustin

(10) Patent No.: US 12,487,316 B2
(45) Date of Patent: Dec. 2, 2025

(54) DATA NETWORK FOR A VEHICLE COMBINATION

(71) Applicant: VOLVO TRUCK CORPORATION, Gothenburg (SE)

(72) Inventor: Roman Iustin, Mölnlycke (SE)

(73) Assignee: VOLVO TRUCK CORPORATION, Gothenburg (SE)

(*) Notice: Subject to any disclaimer, the term of this patent is extended or adjusted under 35 U.S.C. 154(b) by 191 days.

(21) Appl. No.: 18/264,850

(22) PCT Filed: Mar. 11, 2021

(86) PCT No.: PCT/EP2021/056225
§ 371 (c)(1),
(2) Date: Aug. 9, 2023

(87) PCT Pub. No.: WO2022/171312
PCT Pub. Date: Aug. 18, 2022

(65) Prior Publication Data
US 2024/0118376 A1    Apr. 11, 2024

(30) Foreign Application Priority Data
Feb. 15, 2021 (EP) .................. 21157187

(51) Int. Cl.
*G01S 5/02* (2010.01)
*B60R 16/023* (2006.01)

(52) U.S. Cl.
CPC .......... *G01S 5/0284* (2013.01); *G01S 5/0264* (2020.05); *B60R 16/023* (2013.01)

(58) Field of Classification Search
None
See application file for complete search history.

(56) References Cited

U.S. PATENT DOCUMENTS 10,516,456 B1    12/2019 Fuleshwar Prasad et al.
2002/0003488 A1    1/2002 Levin et al.
(Continued)

FOREIGN PATENT DOCUMENTS

EP    3618564 A1    3/2020
EP    3726242 A2    10/2020
(Continued)

OTHER PUBLICATIONS

International Search Report and Written Opinion of the International Searching Authority in corresponding International Application No. PCT/EP2021/056225 mailed Nov. 3, 2021 (14 pages).
(Continued)

*Primary Examiner* — Daniel L Greene
(74) *Attorney, Agent, or Firm* — Venable LLP; Jeffri A. Kaminski

(57) ABSTRACT

A vehicle network for a vehicle, which is couplable to a further vehicle to form a vehicle combination, the vehicle network comprising an inter-vehicle transceiver configured to communicate with a corresponding inter-vehicle transceiver of a vehicle network in said further vehicle, the intervehicle transceiver further configured to perform beam adaptation guided by: (a) radio measurements aiming to localize the corresponding inter-vehicle transceiver, or (b) an articulation angle of the vehicle combination.

20 Claims, 9 Drawing Sheets

(56) References Cited

U.S. PATENT DOCUMENTS

| | | | |
|---|---|---|---|
| 2018/0259641 A1* | 9/2018 | Vacanti | G01S 13/953 |
| 2019/0064338 A1* | 2/2019 | Holt | H01Q 1/525 |
| 2019/0064835 A1 | 2/2019 | Hoofard et al. | |
| 2020/0077279 A1 | 3/2020 | Foerster et al. | |
| 2020/0247200 A1 | 8/2020 | Ferrer et al. | |
| 2020/0319327 A1* | 10/2020 | Tsvelykh | G01S 13/933 |
| 2021/0235285 A1* | 7/2021 | Guerena | H04W 16/28 |

FOREIGN PATENT DOCUMENTS

| | | |
|---|---|---|
| EP | 3726242 A3 | 1/2021 |
| JP | 2020113228 A | 7/2020 |

OTHER PUBLICATIONS

Written Opinion of the International Preliminary Examining Authority in corresponding International Application No. PCT/EP2021/056225 mailed Feb. 23, 2022 (7 pages).

International Preliminary Report on Patentability in corresponding International Application No. PCT/EP2021/056225 mailed May 3, 2023 (6 pages).

Christopher Charles De Saxe, "Vision-based trailer pose estimation for articulated vehicles"; DOI: 10.17863/CAM.14370; Nov. 8, 2017, Retrieved from the Internet: URL: https://www.repository.cam.ac.uk/bitstream/handle/1810/268169/deSaxe-2017-PhD.pdf?sequence=1&isAllowed=y; XP055517775.

* cited by examiner

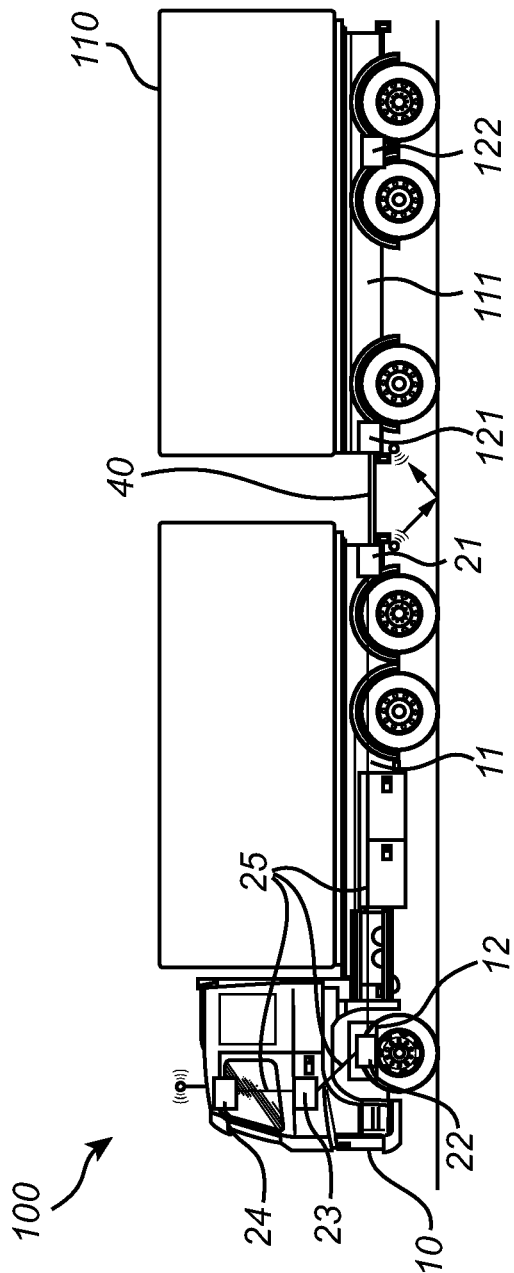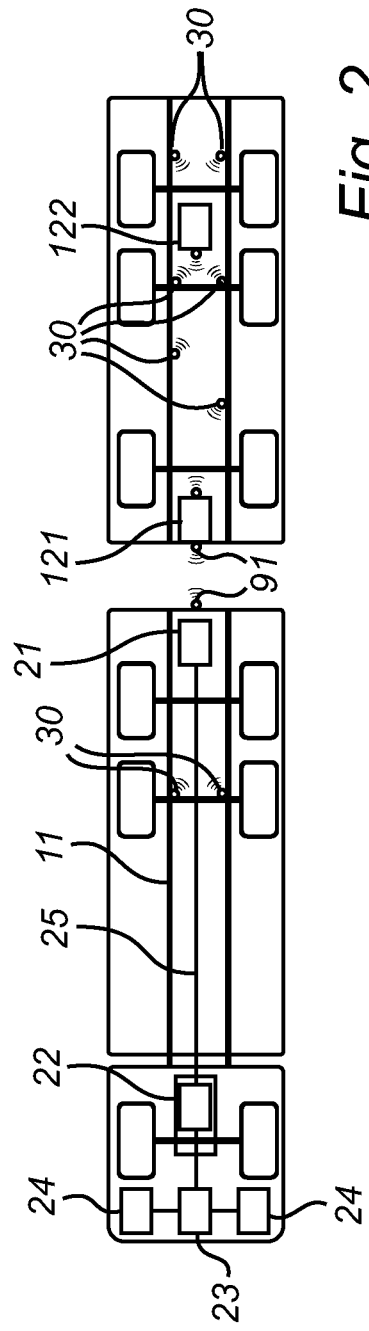

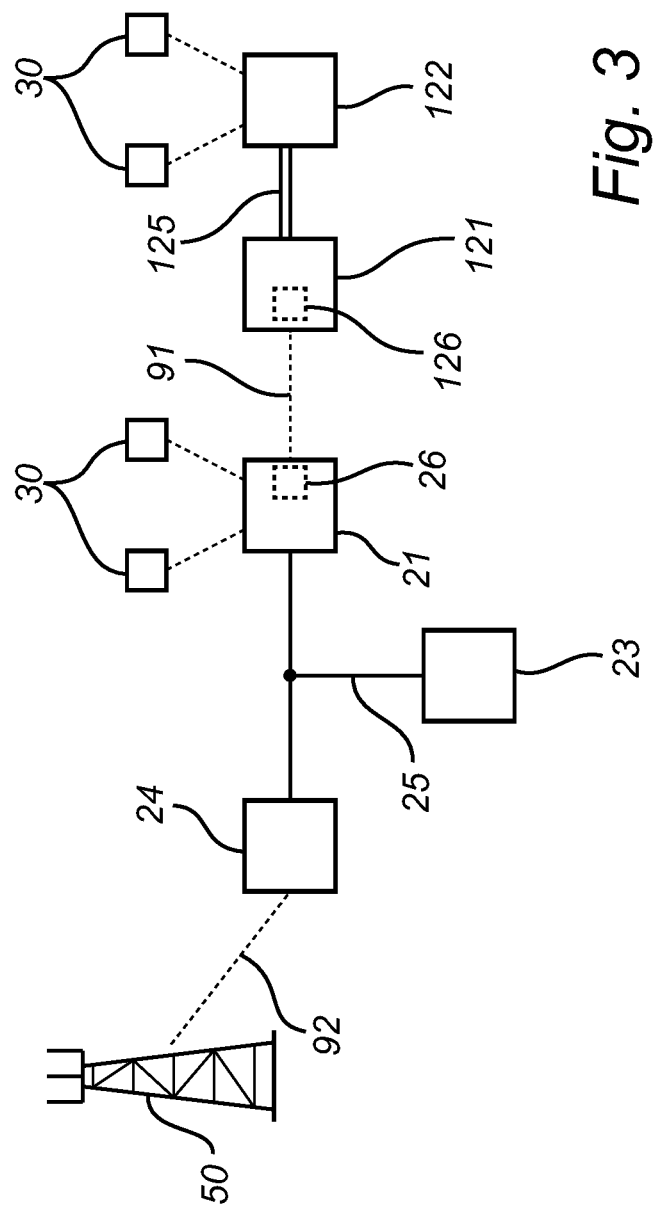

DATA NETWORK FOR A VEHICLE COMBINATION

CROSS-REFERENCE TO RELATED APPLICATIONS

This application is a U.S. National Stage application of PCT/EP2021/056225, filed Mar. 11, 2021 and published on Aug. 18, 2022, as WO 2022/171312, which claims the benefit of European Patent Application No. 21157187.2, filed Feb. 15, 2021, all of which are hereby incorporated by reference in their entireties.

TECHNICAL FIELD

The present disclosure relates to the field of vehicular information and communication technology. In particular, it proposes methods and devices for establishing a data network across coupled vehicle units in a vehicle combination.

BACKGROUND

Non-permanent vehicle combinations in commercial use are frequently decoupled to let the vehicles operate independently or recouple them to form new combinations. This handling is much expedited if the coupling and decoupling procedures are fast and simple, with as little need for manual intervention as possible. The coupling procedure may include establishing a solid connection (e.g., drawbar, kingpin, fifth wheel) between the vehicles and pairing electric lines, pneumatic or hydraulic hoses, and data connectors. The standards ISO 11992 (implemented mainly in the European Union) and SAE J1939 (implemented mainly in the United States) specify lower protocol layers of wired data interfaces for connecting heavy road vehicles. The data interfaces allow interworking with a Controller Area Network (CAN) bus. Measured by present-day yardsticks, the throughput of these standardized interfaces is fairly limited.

In recent years, with the development of advanced control and sensor technology, a need for reliable high-bandwidth data communication throughout the vehicle combination has emerged. For instance, real-time video data at 50 Mbps may be collected from sensors in the trailer and displayed in the driver cab of the tractor vehicle. In other applications, the sensor information is transferred to a cloud processing resource or a back-office location for further analysis and decision-making. The addition of a step in the coupling procedure where data connectors of a novel format are to be combined manually would not easily gain acceptance in the user community. Since the mentioned industry standards have not evolved to offer the required bandwidths, one may also foresee difficulties with interoperability, as manufacturers tend to specialize in trucks only or trailers only, but rarely offer both. For these reasons, wireless solutions are worth exploring.

As one example, EP3618564A1 discloses a system for supporting communication between a tractor and a plurality of trailers by means of wireless links. Each of the trailers is equipped with a communication module which has wired links to local sensors and forwards data read from the sensors to a leading trailer using a directional antenna. The communication module may also relay sensor data sent from a trailing vehicle unit. The reliability and efficiency of this system are open to further development.

SUMMARY

An overreaching objective of the present disclosure is to make available a common communication platform for a vehicle combination. One particular objective is to propose a vehicle network which is extendable in the sense that, when the vehicle is coupled to a further vehicle with a corresponding vehicle network, the two vehicle networks are joined by means of a wireless inter-vehicle link. It is desirable for the joined networks to have the high-level functionalities of a single network, such as resource sharing, adaptive routing, point-to-point connectivity. It is a further objective to provide such a wireless inter-vehicle connection with high reliability. It is a further objective to provide such a wireless inter-vehicle connection with high data integrity. It is a still further objective to enable efficient operation of the wireless inter-vehicle connection as far as energy consumption and/or radio-frequency emissions are concerned.

At least some of these objectives are achieved by the invention defined in the independent claims. The dependent claims relate to advantageous embodiments.

In a first aspect of the invention, there is provided a wired or wireless vehicle network for a vehicle. The vehicle can be coupled to a further vehicle to form a vehicle combination. The vehicle network comprises an inter-vehicle transceiver configured to communicate with a corresponding inter-vehicle transceiver of a vehicle network in said further vehicle. The inter-vehicle transceiver is further configured to perform beam adaptation guided by radio measurements aiming to localize the corresponding inter-vehicle transceiver, or an articulation angle of the vehicle combination, or both.

Because the vehicle networks of the respective coupled vehicles are joined (bridged) by the pair of inter-vehicle transceivers, each vehicle's vehicle network may operate internally without significant differences whether the vehicle is in a coupled or decoupled state. This simplifies integration and interoperability, whereas the joined vehicle networks are not limited to simple data forwarding but are capable of providing the high-level functionalities of a single network (e.g., resource sharing, adaptive routing, point-to-point connectivity). Further, because each inter-vehicle transceiver is configured for beam adaptation, the wireless link or links between the coupled vehicles will be steadily improved and adjusted for efficiency and/or reliability. When the coupled vehicles move on a curved or sloping road, the adjustments of the wireless inter-vehicle link may at least partially compensate fluctuations in the momentary geometry, including changes to the relative orientation of the vehicles. The beam adaptation loop may use feedback information from radio measurements, or feedforward information from an articulation angle measurement/estimation, or both.

In a second aspect of the invention, there is provided a method of operating a vehicle network installed in a vehicle. The method comprises: detecting that the vehicle is being or has been coupled to a further vehicle to form a vehicle combination; establishing a communication link from an inter-vehicle transceiver of the vehicle network to a corresponding inter-vehicle transceiver of a vehicle network in said further vehicle; and maintaining the communication link while performing beam adaptation. The beam adaptation may include performing a radio measurement aiming to localize the corresponding inter-vehicle transceiver and guiding the beam adaptation based thereon and/or measuring or estimating an articulation angle of the vehicle combination and guiding the beam adaptation based thereon.

A third aspect of the invention relates to a computer program containing instructions for causing a computer, or the vehicle network in particular, to carry out the above method. The computer program may be stored or distributed on a data carrier. As used herein, a "data carrier" may be a transitory data carrier, such as modulated electromagnetic or optical waves, or a non-transitory data carrier. Non-transitory data carriers include volatile and nonvolatile memories, such as permanent and non-permanent storage media of magnetic, optical or solid-state type. Still within the scope of "data carrier", such memories may be fixedly mounted or portable.

Generally, the second and third aspects of the invention share the advantages of the first aspect and can be implemented with corresponding technical variations without departing from the scope of this disclosure.

In one embodiment, the inter-vehicle transceiver is configured for radio-based localization on the basis of a data-carrying signal emitted by the corresponding inter-vehicle transceiver. Compared to the option of measuring on a pilot signal from the corresponding inter-vehicle transceiver, this embodiment conserves radio resources.

In one embodiment, the inter-vehicle transceiver is configured to determine the articulation angle on the basis of map information and a current vehicle position. This may include using the map information to estimate a local radius of horizontal curvature of a road which the vehicle combination follows, from which a yaw component $\phi$ of the articulation angle can be determined. Alternatively, if the map information includes topographical data (e.g., elevation, altitude, contours, inclination), this data may be used to estimate a local radius of vertical curvature of a road segment which the vehicle combination occupies, from which a pitch component $\theta$ of the articulation angle can be determined. The beam direction of the inter-vehicle transceiver is then adjusted in accordance with the pitch and/or yaw component of the articulation angle. The map-based approach to estimating the articulation angle may be relatively fast, e.g., it may outperform radio-based localization when the vehicle combination moves at highway speed. The map-based approach can be used in alternation with an articulation angle sensor, e.g., as a fallback data source if the accuracy of the sensor drops and vice versa.

In one embodiment, the inter-vehicle transceiver is configured to estimate the variability over time of the articulation angle or the location of the corresponding inter-vehicle transceiver, and to adapt the beam width in dependence of the variability.

In one embodiment, the beam adaptation is furthermore guided by meteorological data. It is primarily relevant to account for meteorological factors that are known or expected to influence the propagation of radio waves, such as visibility, precipitation, humidity, and/or temperature. The meteorological factors may influence different aspects of the propagation, such as attenuation, beam directivity and scattering, and suitable responses may include adjustments of transmit power and/or beam width.

In one embodiment, the inter-vehicle transceiver is in a non-moving relationship with a frame of the vehicle. By not mounting the inter-vehicle transceiver on a coupling element, the transceiver can be used already before the vehicle combination has been formed, for instance, to assist the coupling procedure as described in applicant's co-pending application EP20198913.4 and other disclosures. This however makes it advisable to adapt the inter-vehicle beam during pitch and yaw movements as well as other stationary or moving configurations of the vehicle combination that may temporarily alter the alignment of a pair of inter-vehicle transceivers. For example, the inter-vehicle beam may need to be realigned.

In one embodiment, the inter-vehicle transceiver communicates by modulating a radar wave to be emitted by an automotive radar unit. The automotive radar unit, with sensing or ranging as its basic task, may be comprised in the inter-vehicle transceiver or connected to it. This reduces the number of physical units in the vehicle. Example radar frequencies may belong to the range 76-81 GHz, such as 78 GHz.

In one embodiment, the inter-vehicle transceiver is configured to interact with the corresponding inter-vehicle transceiver by backscattering to perform a distance measurement, even before the vehicle has been coupled to the further vehicle. The interaction by backscattering may be described as a communication with the corresponding inter-vehicle transceiver in transponder mode. The backscattered wave may be a radio-frequency wave or an optical wave. The distance measurement may optionally be made available to assist a coupling procedure (or dock-assist procedure).

In one embodiment, the inter-vehicle transceiver is configured to generate a beam reaching the corresponding inter-vehicle transceiver after one ground reflection. This is advantageous, for example, if the direct path between the intervehicle transceivers is obscured by a drawbar, crossmember or other elements of a solid connection. It may be especially relevant when the inter-vehicle transceivers communicate at relatively high frequencies, for which the beam is generally narrower.

In one embodiment, the inter-vehicle transceiver is configured to transmit the beam at 5 GHz or more, preferably at least 30 GHz, preferably at least 60 GHz. This is a frequency range where spectrum is commercially available (licensable) and which leaves implementers with a certain liberty to select a desired degree of directivity. Unlicensed spectrum is available as well, including the $9^{th}$, $10^{th}$ and $11^{th}$ Industrial, Scientific and Medical (ISM) bands: 5725-5875 MHz (center frequency 5800 MHz), 24-24.25 GHz (center frequency 24.125 GHz) and 61-61.5 GHz (center frequency 61.25 GHz).

As used in this disclosure, an "articulation angle" may include a yaw angle $\phi$, a pitch angle $\theta$ or both. The yaw articulation angle $\phi$ is illustrated in FIG. 7. The yaw and pitch articulation angles may be defined with respect to the longitudinal axes $X_{10}$, $X_{110}$ of the coupled vehicles. These longitudinal axes $X_{10}$, $X_{110}$ may be defined relative to the frames or chassis of the vehicles, and they may be so located as to intersect at the articulation point between the coupled vehicles and to be parallel when the vehicle combination moves straight on a flat road.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, on which:

FIG. 1 is a side view of two coupled vehicles which form a vehicle combination where respective vehicle networks are joined by a pair of inter-vehicle transceivers;

FIG. 2 is a schematic view from below highlighting the components of the vehicle networks in the vehicle combination of FIG. 1;

FIGS. 3 and 4 are functional block diagrams of vehicle combination wide networks, each formed by two vehicle networks that are joined by a pair of inter-vehicle transceivers;

DETAILED DESCRIPTION

Figure 4:
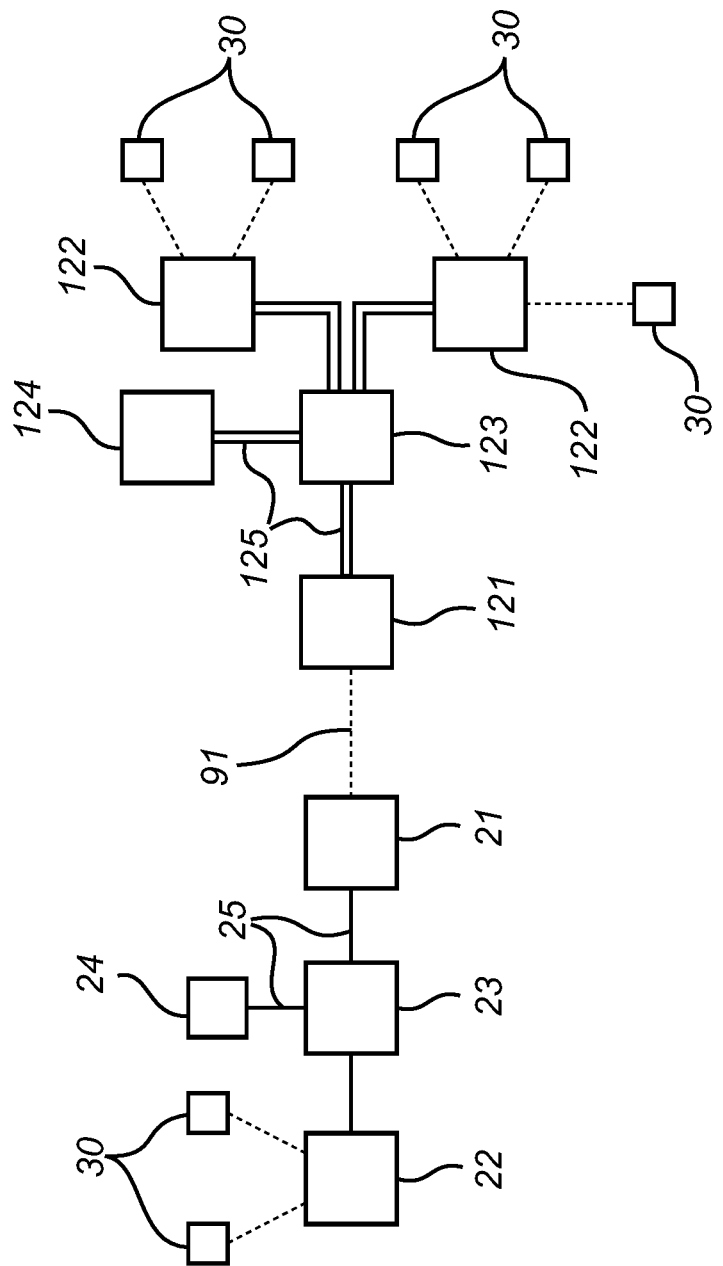

The aspects of the present disclosure will now be described more fully hereinafter with reference to the accompanying drawings, on which certain embodiments of the invention are shown. These aspects may, however, be embodied in many different forms and should not be construed as limiting; rather, these embodiments are provided by way of example so that this disclosure will be thorough and complete, and to fully convey the scope of all aspects of the invention to those skilled in the art. Like numbers refer to like elements throughout the description.

FIG. 1 is a side view of tractor 10 and a trailer no, which are coupled to form a vehicle combination 100. The tractor 10 is equipped with a propulsion system, including a central engine 12 or distributed engines. The trailer no may in principle include an independent propulsion system or a subsidiary propulsion system which is configured or controlled to mimic the acceleration of the tractor 10; typical commercial trailers no however are equipped with a braking system but no propulsion means. The mechanical coupling between the vehicle units 10, 110 is provided by a drawbar 40 which, at least at the front (tractor) end, is secured in a swiveling fashion to a frame 11 of the tractor 10. The rear end of the drawbar 40 may be rigidly secured in the yaw dimension to a front wheel axle, which is steerable in relation to the frame in of the trailer 110. The drawbar 40 may optionally be swivelable in the pitch dimension with respect to said front wheel axel, to facilitate movement in hilly terrain, over occasional curbstones, and more generally to improve the vehicle combination's 100 vertical curvetaking. The longitudinal axes $X_{10}$, $X_{110}$ of the tractor 10 and trailer 110 define the articulation angle of the vehicle combination 100, denoted ϕ (yaw component) and θ (pitch component) in the present disclosure.

The vehicle combination's 100 remaining components 21, 22, 23, 24, 25, 121, 122—all network-related—are easier to discern in the schematic bottom view of FIG. 2 and will now be described with reference to that drawing. A vehicle network of the tractor 10 comprises a host computer 23 (e.g., a vehicle unit computer (VUC), a telematic control unit (TCU) or a wireless communication host (WCH)) with wired connections 25 to roof-mounted wireless gateways (WGW) 24 and to a wireless sensor gateway (WSGW) 22.

Each wired connection 25 is preferably a high-speed, digital connection suitable for conveying baseband signals.

The roof-mounted wireless gateways 24 may include a cellular, satellite or local-area network transceiver configured to provide Internet connectivity to the vehicle network, e.g., using a broadband radio access network technology. The cellular transceiver may be adapted to connect to nodes of a cellular radio access network according to GSM, UMTS, LTE, NR ("5G") or similar technology for general-purpose data communication. Vehicle-specific cellular technology may be used, such as C-V2X. The local-area network transceiver, to be distinguished from the vehicle-internal network, may be any mobile station compliant with IEEE 802.11, such as IEEE 802.11p (also referred to as DSRC in the United States and ITS-G5 in the European Union) or IEEE 802.11ad in particular. The WGW 24 may be embodied as a so-called intelligent antenna module (or smart antenna module, or radio-integrated antenna, or antenna-integrated transceiver, or antenna-integrated radio, or integrated antenna module), which for purposes of the present disclosure signifies that the baseband circuitry is co-located with the antenna element(s), without a wired connection therebetween. The use of intelligent antenna modules enables a future migration from the low gigahertz frequency range to tens of gigahertz (e.g., 28-30 GHz) without massive energy losses; indeed, a carrier signal that travels in a coaxial cable (of convenient outer dimensions) is known to suffer significant attenuation at high frequency. No comparable attenuation problem affects the network-internal wired connections 25, where the designer can use any suitable frequency range.

A WSGW 22 may be configured to collect measurement data from sensors 30 in its vicinity or, possibly, from relatively remoter sensors 30 as long as its line of sight is reasonably unobscured or the radio conditions are otherwise feasible. The WSGW 22 may include intelligent antenna modules. The sensors 30 may be mounted on the tires, at the engine 12, on the chassis, in the driver's cab, and they may be configured to capture audiovisual media as well as physicochemical quantities, such as pressure, fluid flow, temperature, vibration, strain, angular position, electric current and voltage. By collecting the measurement data wirelessly, it is possible to avoid awkward cable routing as well as vibration- or dirt-induced cable faults, especially for moving or heated parts. The sensors 30 themselves, unless battery-powered or otherwise self-supplied, need only be connected to electric power, which is generally more robust than wired data lines. The collected measurement data is forwarded from the tractor's 10 WSGW 22 to the host computer 23 over the wired connection 25.

In some embodiments, a WSGW 22 further comprises an edge computing unit, which processes the measurement data locally. Then, it may only be necessary to report trend changes to the host computer 23. For example, the WSGW 22 may be configured to collect image data from a camera and detect objects of specific types in the image data; only the detected objects are reported. Edge computing architectures not only decrease the load on the vehicle network; some object detection (recognition) algorithms may adapt during runtime and therefore perform better when fed with near real-time data rather than delayed data. As an alternative to using the WSGW 22 for edge computing, such computing functionalities can be provided in the trailer's 110 central processor 123 if the vehicle networks of both the tractor 10 and trailer 110 have central processors 23, 123 (cf. FIG. 3) and the operation of the vehicle combination 100 is being supervised by the tractor's 10 processor 23. Concretely, the trailer's 110 central processor 123 may be configured to receive measurement data from the trailer's 110 sensors 30 via the trailer's WSGW 122 and to extract such information that is relevant for reporting to the tractor's 10 processor 23 rather than forwarding the measurement data as is.

Resuming the description of FIG. 2, it is similarly seen that a vehicle network of the trailer 110 includes a rear WSGW 122 arranged to collect measurement data from a plurality of sensors 30 in its vicinity. The sensors 30 may form part of an advanced driver assistance system (ADAS), such as cameras, lidars or ultrasound sensors, which produce streams of real-time output data with a comparatively high data rate (e.g. 20 Mbps), which can normally not be accommodated in a legacy network, such as a minimal ISO 11992-compliant network. The vehicle network of the trailer 110 differs from that of the tractor 10 in that the network components are connected by wireless links only, as will be described next.

The tractor and trailer vehicle networks are joined by a wireless data link 91 (including an uplink, a downlink or both), which is established and maintained by respective inter-vehicle transceivers 21 and 121. As shown in FIG. 2, the inter-vehicle transceivers 21 and 121 of this embodiment are multifunctional devices which also act as WGSWs serving nearby sensors 30. Accordingly, the measurement data collected by the trailer's 110 front WSGW 22 is delivered to the host computer 23 by being transmitted over the wireless link 91 and then onwards via a wired connection 25. The measurement data collected by the trailer's 110 rear WSGW 22 reaches the host computer 23 via a wireless intra-network link to the inter-vehicle transceiver 121, the wireless link 91 and then the wired connection 25 in the tractor's 10 vehicle network. Data may travel in the opposite direction as well, e.g., to update software executing in the sensors 30 arranged in the trailer 110. Furthermore, the joining also makes resource sharing possible, including the provision of Internet connectivity to the trailer's 110 vehicle network, whose components are now connectable to the WGWs 24 thanks to the wireless link 91.

The inter-vehicle transceivers 21, 121 are configured to generate radio beams with high directivity (pencil beams) and/or with rapid attenuation with distance. These aims may be achieved by transmitting at high frequency and/or by the use of one- or two-dimensional antenna arrays. Example frequency ranges are 5 GHz or more, preferably 30 GHz or more, preferably 60 GHz or more. The ITU band ii (IEEE V band) may be suitable. Examples of useful radio technologies include IEEE 802.11, LTE, 5G NR, IEEE 802.15.4, sub-GHz radio (315/433), IEEE 802.11p (ITS-G5 interface), C-V2X (PC5 interface), DSRC, GNSS, millimeter wave, BLE and Satcom. The inter-vehicle transceivers 21, 121 may include intelligent antenna modules. The inter-vehicle transceivers 21, 121 are further configured, when maintaining the wireless data link 91 between the tractor 10 and trailer 110, to perform beam adaptation (or beam steering, or beamforming) adaptively. The beam adaptation may include adjusting antenna array weights, corresponding to the relative transmit powers and/or phase shifts among antenna elements in the arrays.

The trailer inter-vehicle transceiver 121 may be configured to execute a beam adaptation loop for the uplink, i.e., payload data traveling towards the tractor inter-vehicle transceiver 21, while the tractor inter-vehicle transceiver 21 may execute a beam adaptation loop for the downlink, where payload data is transferred in the opposite direction. In keeping with commonly used terminology in telecommunications, the uplink is operated in accordance with so-called downlink control data (i.e., signaling transmitted over the downlink that relate to the operation of the uplink) and the downlink is operated according to uplink control data (i.e., signaling on the uplink regarding the downlink). Each beam adaptation loop may use feedback information from radio measurements. For example, the trailer inter-vehicle transceiver 121 may receive feedback information from the tractor inter-vehicle transceiver 21 relating to the direction of the uplink beam (radio-based localization), its signal power, signal-to-noise ratio and other useful figures-of-merit. As another example, the trailer inter-vehicle transceiver 121 may perform corresponding measurements on the downlink beam and use these—under an assumption of channel reciprocity—to adapt the uplink beam. As a still further example, only one of the inter-vehicle transceivers 21, 121 executes a beam adaptation loop, but the resulting beam adaptation control data are used by both inter-vehicle transceivers 21, 121. Either way, the radio-based localization may be performed on a reference signal (e.g., pilot signal, synchronization signal) or on a data-carrying signal. The option of measuring on a signal carrying payload or control data is likely to consume less radio resources (i.e., the measurement has a smaller footprint in a time—frequency grid) but may still be sufficient for localization purposes.

Alternatively or additionally, each or both beam adaptation loops are guided by feedforward information from an articulation angle sensor or articulation angle estimator. If the inter-vehicle transceivers 21 and 121 are attached to elements of the vehicle frames ii, 111—or if they are otherwise arranged in non-moving relationships with the respective frames ii, 111—then changes in the uplink and downlink beam angles will follow sensed or estimated changes in the articulation angle. Accordingly, it is possible to predict fast and reliably the change in beam angle to be expected when the articulation angle changes as a result of a horizontal or vertical curve. Articulation angle sensors are known in the art, and may use as input a lidar, a radar, a camera, a gyro, an angle sensor, a magnetometer, a Hall sensor or a combination of these. One example is the kingpin sensor disclosed in U.S. Pat. No. 5,152,544; it includes a magnet carrying cap mounted in a fifth wheel, which can be coupled to the trailer king pin and carries magnetic means to form a magnetic sensor (magnetometer) for sensing the articulation angle or one of the derivatives thereof. Kinematics- and dynamics-based articulation angle estimators, which may combine measurements of kinematic quantities to update the articulation angle continuously, are discussed in the applicant's co-pending application EP21152300.6. If the articulation angle data source—whether it is a sensor or an estimator—is located in the tractor 10, the articulation angle data will be forwarded to the trailer inter-vehicle transceiver 121 to adjust the uplink beam, and vice versa. If this data becomes unavailable as a result of a failure of the wireless link 91, the trailer inter-vehicle transceiver 121 can be configured to transmit the beam in a default direction and/or to temporarily use wide-beam settings for its antenna arrays, thereby allowing the wireless link 91 to be robustly reestablished.

In a further development of these embodiments, a beam adaptation loop may consider not only momentary values but also the variation over time. This applies both to the radio-localized position of the corresponding inter-vehicle transceiver and to the measured or estimated articulation angle $\phi$, $\theta$. More precisely, in response to finding that the position or articulation angle has a relatively high variability (as measured, e.g., by statistical variance, standard deviation, range), the beam adaptation loop may be configured adjust the beam width to have a relatively greater value. This may suppress unstable behavior of the control loop (oscillation) and reduce its response time (transient time). Conversely, if the position or articulation angle is relatively stable over time, the beam adaptation loop may use settings that render the beam narrower, i.e., more directional, which improves the energy efficiency, reduces radio emissions and limits the exposure to eavesdropping. The variability may be estimated in a moving time window of the order of 1 minute; a longer or shorter time window may be used as well.

In some embodiments, the beam adaptation loop may further consider meteorological data indicative of local weather conditions where the vehicle is operating. The meteorological data may be measured by sensors arranged in the vehicle or retrieved from an online weather data source. The meteorological data may be represented as a vector $m=(m_1, \ldots, m_p)^T$ of variables, such as visibility, precipitation, humidity and temperature. The inter-vehicle beam may be adjusted with respect to a vector of parameters $s=(s_1, \ldots, s_q)^T$ such as the transmit power or the beam width in a pitch and/or yaw dimension. For instance, the transmit power may be increased in response to a change into such meteorological conditions for which an increased radio-frequency attenuation is expected.

For this purpose, the beam adaptation loop may be configured with a vector $m^{(0)}$ containing a default value of each meteorological variable, a vector $s^{(0)}$ of default parameter settings, and a q×p matrix W containing a (signed) sensitivity coefficient with respect to each meteorological variable. Then, the adaptation loop may adjust the beam parameters in accordance with the following linear equation:

$$s=s^{(0)}+W(m-m^{(0)}).$$

In a variation, the adaptation loop may be configured to only take action in response to such deviations from the default meteorological values $m^{(0)}$ that represent worsening conditions. This may be implemented by redefining the linear equation as:

$$s=s^{(0)}+W(m-m^{(0)})^+,$$

where $(x)^+=\max(0, x)$ denotes (element-wise) positive part. For purposes of this implementation, it may be necessary to redefine some of the meteorological variables such that, when any of the variables undergoes a positive increment, this represents a change into worsening conditions. (Equivalently, one may instead redefine some of the meteorological variables such that all negative increments represent worsening conditions.)

It is noted that the wireless link 91 in the embodiment shown in FIGS. 1 and 2 includes a ground reflection. For simplicity, FIG. 1 shows this ground reflection only for the downlink beam, though the uplink may have a similar path. At the cost of some radio attenuation, a path with a ground reflection allows the beam to propagate in a region of space physically separated from the drawbar 40, which is typically metallic and may thereby produce obscuration, absorption, scattering and related undesired effects. Put differently, the path with a ground reflection is chosen because the vehicle combination in FIG. 1 does not allow a line of sight between the inter-vehicle transceivers 21, 121. The inter-vehicle transceivers 21, 121 are preferably arranged at such height that the ground reflection deflects the beam by an approximate right angle. If beam angle changes are predicted on the basis of the measured or estimated articulation angle, the introduction of a ground reflection will not affect the yaw component significantly. The relation between the pitch component of the articulation angle and the pitch component of the transmit angle for a reflected beam can be found by a simple calculation.

FIG. 3 is a functional block diagram of two vehicle networks, which are joined by a wireless link 91 provided by a pair of inter-vehicle transceivers 21, 121. The left-hand vehicle network includes a WGW 24 which has a wireless link to a base station 50 of a radio access network, which provides at least data and voice services. The WGW 24 has wired connections 25 to a central processor (or VUC) 23 and a multifunctional inter-vehicle transceiver 21. The inter-vehicle transceiver 21 has the further functionality of collecting measurement data from sensors 30 and forwarding the data to other parts of the vehicle network, such as the central processor 23 or the WGW 24 for use outside the vehicle. The inter-vehicle transceiver 21 further includes an automotive radar unit 26 configured to emit a radar wave and detect resulting reflected or scattered waves. One use of the automotive radar unit 26 is ranging of physical objects. The automotive radar unit 26 may also be utilized for communication purposes, namely, to use the radar wave as a medium of the wireless link 91. This may be achieved by modulating the radar wave so that it carries the data to be exchanged between the two joined vehicle networks, i.e., over the wireless link 91, in such manner that the modulation does not affect the basic uses of the radar (e.g., ranging) or does so in a predictable and compensable way. The modulation may be analog or digital. The inter-vehicle transceiver 121 of the other vehicle is configured to receive a radar-frequency wave and demodulate it, e.g., the inter-vehicle transceiver 121 may include a compatible automotive radar unit 126. As it may be expected that a modulation carrying a higher data rate interferes to a greater degree with the basic radar functionalities, this option is of interest at least in the link with the smaller traffic volume, which is normally the downlink, which carries payload data away from components in charge of the processing, display and analysis of sensor data.

The right-hand vehicle network in FIG. 3, which may be arranged in a trailer or tractor or another vehicle type, comprises the bifunctional inter-vehicle transceiver 121 with the radar unit 126 and, further, a WSGW 122 configured to collect measurement data from sensors 30. The connection 125 between the inter-vehicle transceiver 121 and the WSGW 122 may be wired or wireless, whichever is considered most suitable for the use case at hand. If the connection 125 is wireless, it may utilize a different radio technology than the one which the WSGW 122 uses to collect data from the sensors 30. The left-hand and right-hand vehicle networks are integrated from the point of view of higher protocol layers, so that resource sharing, point-to-point connectivity and similar functionalities become available across the two vehicle networks when the wireless link 91 is established.

FIG. 4 shows, with drawing conventions similar to those in FIG. 3, two joined vehicle networks. The intra-network connections 25 (single solid lines) of the left-hand vehicle network may be wired or wireless, they may include a mixture of these technologies. Independently thereof, the intra-network connections 125 (double solid lines) of the right-hand vehicle network may be designed as wired, wireless or mixed connections.

One notable difference compared to FIG. 3 is that both vehicle networks comprise WGWs 24, 124, so that each has external connectivity, e.g., towards a cellular access network. A benefit of joining the two vehicle networks by the wireless link 91 may be one of redundancy. To mention one example, if the two vehicles are owned by different enterprises which have subscriptions with different telecom operators, the vehicle combination can at each time obtain its connectivity from the operator that currently provides the better coverage. A further difference over FIG. 3 is that each vehicle network has a central processor 23, 123. Yet another difference, still within the scope of the present disclosure, is that the inter-vehicle transceivers 21, 121 are used for the sole purpose of interconnecting the vehicle networks, that is, neither for sensor data collection nor radar services.

Figure 6:
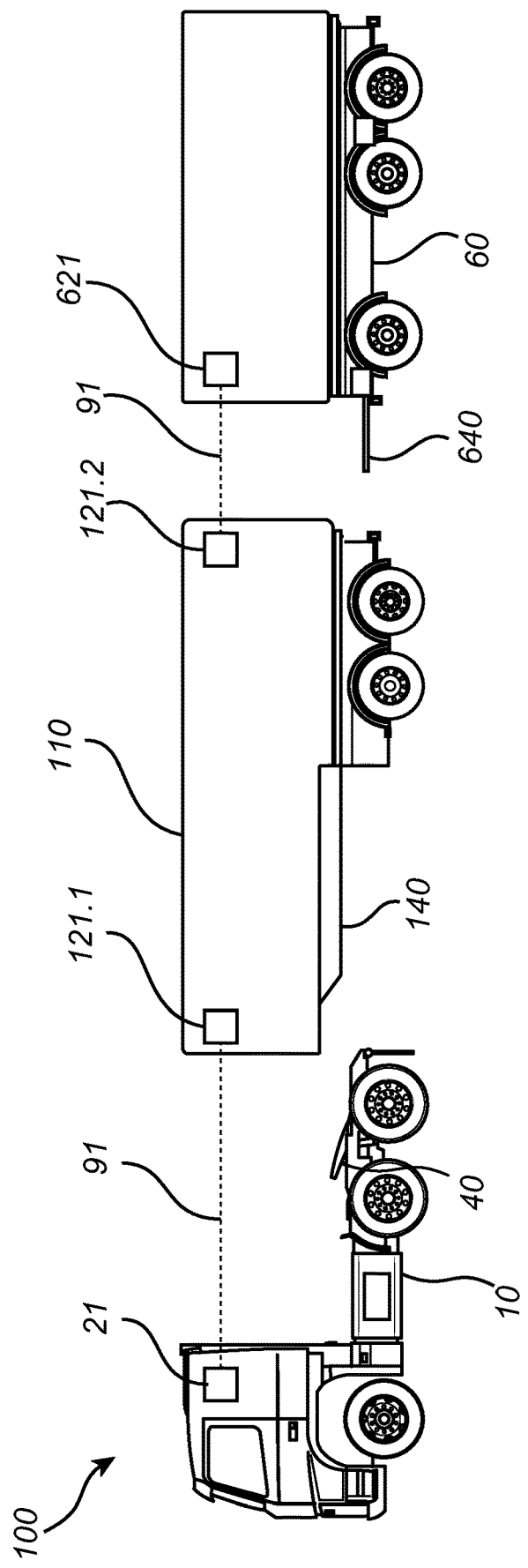
FIG. 6 shows a tractor and two trailers which are positioned to be coupled in order to form a vehicle combination, wherein inter-vehicle transceivers and wireless intervehicle links have been indicated.
Figure 7:
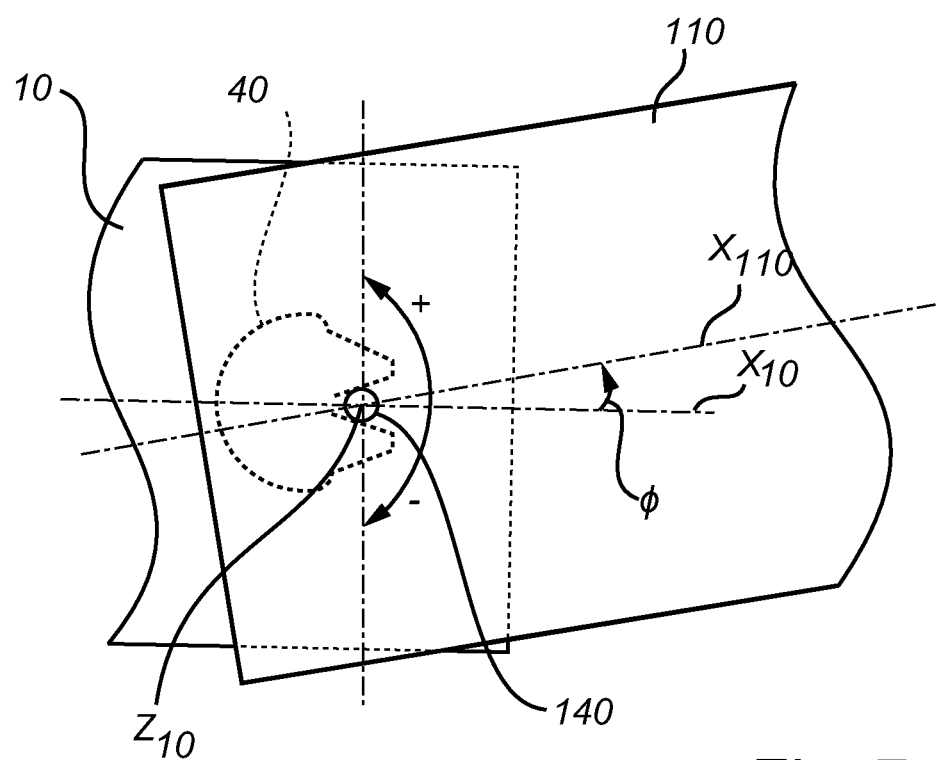
FIG. 7 is a top view of a kingpin engaging a fifth wheel at an articulation point between two vehicles, wherein a yaw component ϕ of an articulation angle has been indicated.

FIG. 6 is a side view of a tractor 10 and two trailers 110, 610 which are positioned to be coupled in order to form a vehicle combination 100. The front trailer 110 is designed to be coupled to the tractor 10 by connecting its kingpin 140 to the tractor's 10 so-called fifth wheel 40. A top view of the connected position is included in FIG. 7, which further indicates the vehicles' 10, 110 longitudinal axes $X_{10}$, $X_{110}$ in dash-dotted line, a vertical axis $Z_{10}$ (orthogonal to the plane of the drawing) though the articulation point, and the yaw component $\phi$ of the articulation angle, which represents a rotation around the vertical axis $Z_{10}$. The rear trailer 610 is adapted for coupling to the front trailer 110 by connecting a drawbar 640 to a hitch on the front trailer 110. Each of the three vehicles 10, 110, 610 is equipped with a vehicle network for supporting sensor data collection, adaptive control and similar functionalities.

When the vehicles 10, 110, 610 are coupled—or already when a coupling procedure is initiated—inter-vehicle transceivers 21, 121.1, 121.2, 621 establish wireless links 91 for joining the respective vehicle networks. For this purpose, the tractor 10 and the rear trailer 610 may include one inter-vehicle transceiver 21, 621 each. The front trailer 110 is equipped with dual inter-vehicle transceivers 121.1, 121.2. Notably, these inter-vehicle transceivers 121.1, 121.2 do not necessarily communicate directly, but the vehicle network of the front trailer 110 act as an intermediary. Accordingly, data collected in the rear trailer 610 is transferred to the tractor 10 in a multi-hop fashion, i.e., via the rear wireless link 91, the vehicle network of the front trailer 110 and the front wireless link 91.

It is further notable that the beams connecting each pair of the inter-vehicle transceivers 21, 121.1, 121.2, 621 are direct, i.e., they do not comprise a ground reflection as in FIGS. 1 and 2. Apart from this difference, the pairs of inter-vehicle transceivers 21, 121.1, 121.2, 621 may perform beam adaptation as described above with references to FIGS. 1 and 2.

Figure 8A:
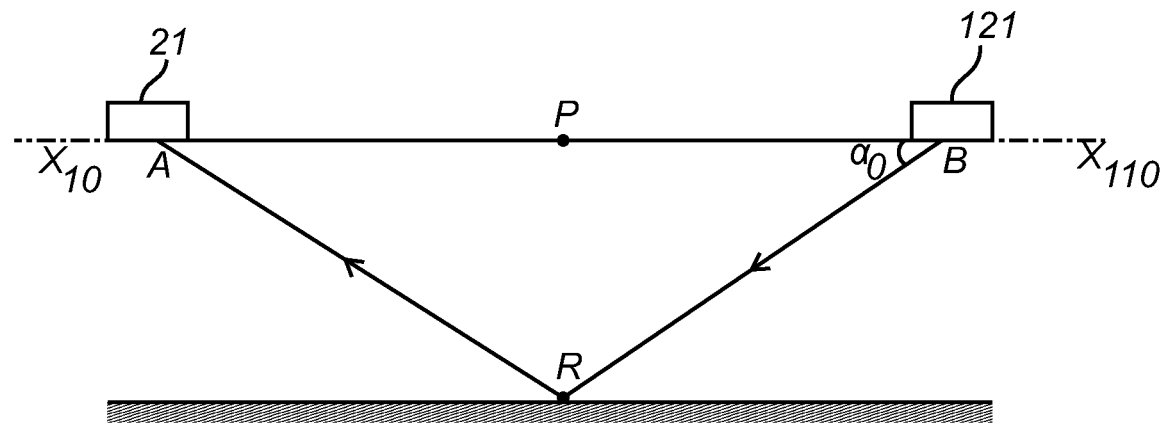
FIG. 8 shows a dependence of the inter-vehicle beam's direction on a pitch component θ of the articulation angle.
Figure 8B:
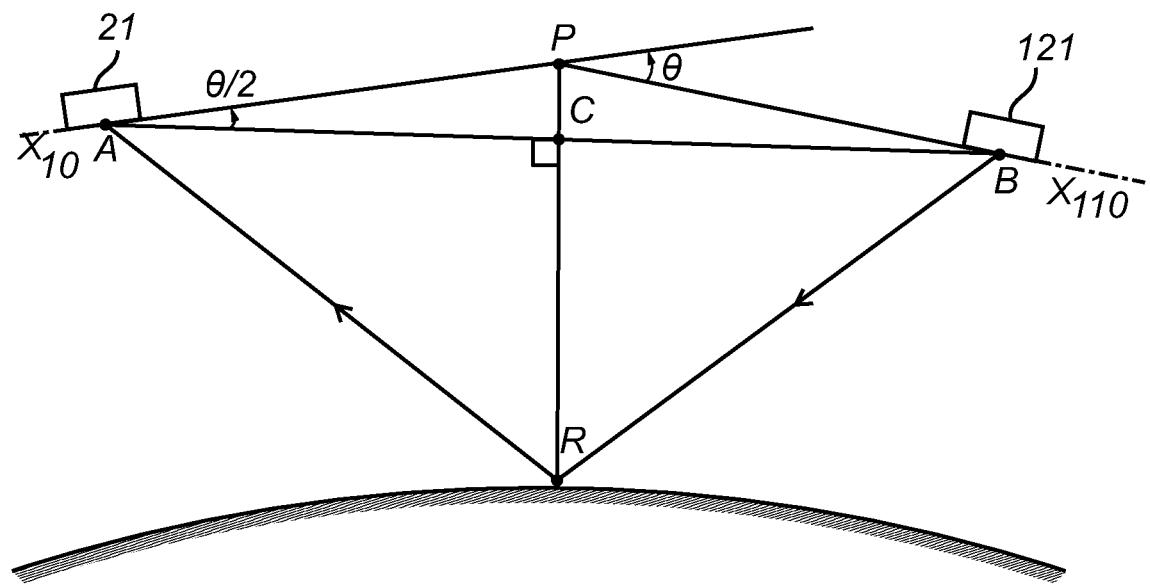
Figure 9:
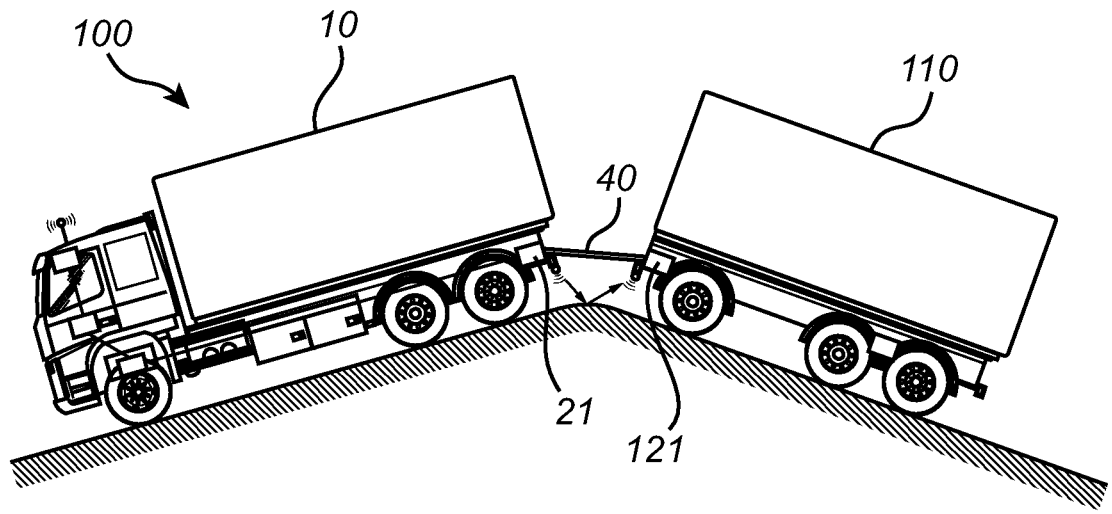
FIGS. 9 and 10 illustrate how the vehicle combination's geometry varies with a local topography.
Figure 10:
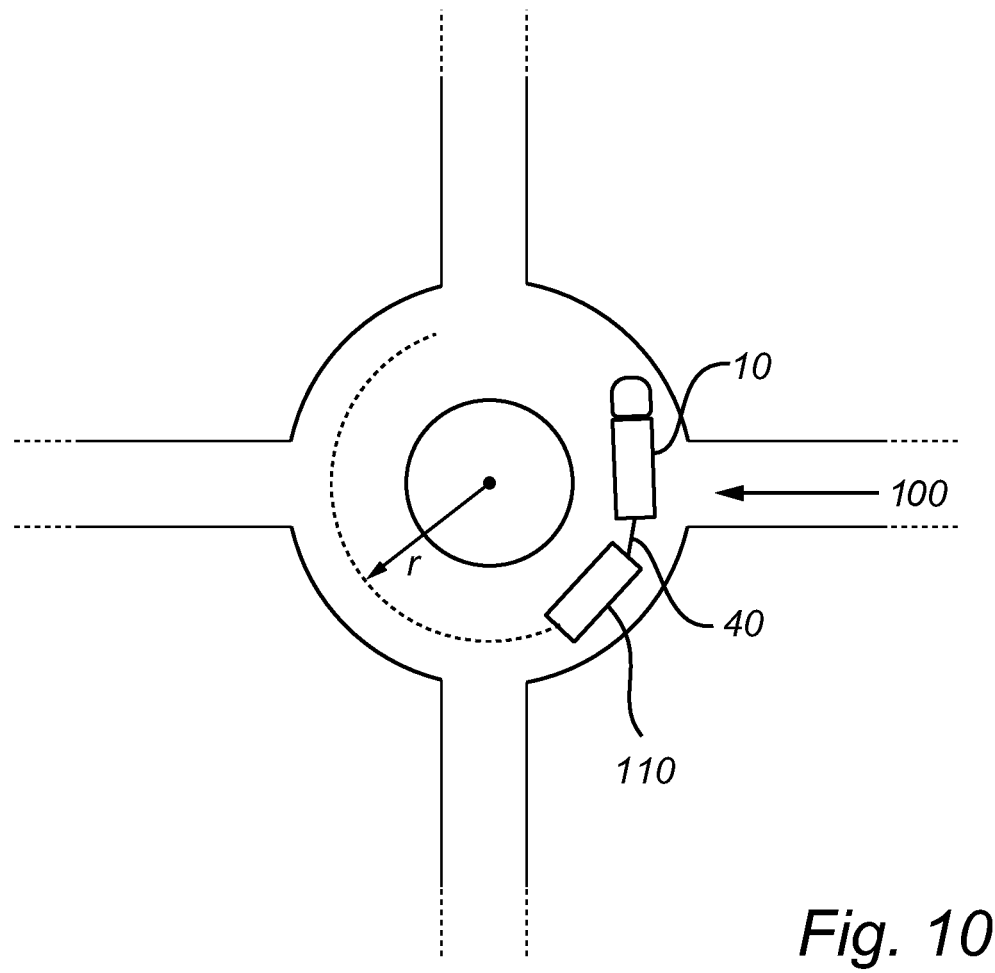

Turning now to FIGS. 8 to 10, an embodiment will be described in which the beam adaptation loop of the inter-vehicle transceiver obtains the articulation angle on the basis of map information and a current vehicle position. Map information in computer-readable form can be obtained from commercial suppliers or from open data sources, such as OpenStreetMap. A copy of the map information may be downloaded and stored in the vehicle (and possibly refreshed subsequently); alternatively, the map information may be retrieved online during runtime and may optionally be buffered for the current region of travel (e.g., next 100 m). The current vehicle position can be obtained from a global navigation satellite system (GNSS) receiver in the vehicle, which is optionally supplemented by an inertial measurement unit (IMU) to provide an approximate vehicle position also when the received GNSS signal power is weak. It may be used—possibly in combination with a history of past positions, a velocity vector or bearing—to locate the vehicle combination 100 relative to structures described by the map, from which geometric properties of the vehicle combination's 100 trajectory can be extracted. This may include using the map information to estimate a local radius of horizontal curvature of a road which the vehicle combination follows, from which a yaw component $\phi$ of the articulation angle can be determined.

FIG. 10 illustrates a simple situation, where a vehicle combination 100 travels in a roundabout lane with a constant radius of curvature r. From the radius of curvature r, the articulation angle can be calculated, wherein the calculation may take into account dimensions of the coupled vehicles 10, 110 and the drawbar 40, and may further consider road friction- and steering-related parameters. Alternatively, if the map information includes topographical data (e.g., elevation, altitude, contours, inclination), this data may be used to estimate a local radius of vertical curvature of a road segment which the vehicle combination occupies, from which a pitch component $\phi$ of the articulation angle can be determined.

Not-to-scale FIG. 9 illustrates a case where the vehicle combination 100 is moving over a hillcrest, which corresponds to a local maximum of the road elevation. As mentioned above, the articulation angle may be defined as the angle under which the longitudinal axes $X_{10}$, $X_{110}$ of the coupled vehicles 10, 110 intersect, and the pitch component $\theta$ can be understood as the articulation angle's projection on the vertical axis or on the vehicle vertical axis.

According to these embodiments, the transmit direction of the inter-vehicle transceivers 21, 121 is adjusted in accordance with the pitch and/or yaw component of the articulation angle.

FIG. 8 illustrates a possible implementation of a beam adaptation loop in the rear inter-vehicle transceiver 121 which adjusts the pitch component of the transmit direction as a function of the pitch component $\theta$ of the articulation angle. More precisely, FIG. 8A illustrates the path of the inter-vehicle beam when the vehicle combination 100 moves on a surface with zero or negligible vertical curvature, so that the effective antennas locations A, B of the inter-vehicle transceivers 21, 121 and the articulation point P are collinear. The rear inter-vehicle transceiver 121 transmits the first segment BR of the inter-vehicle beam at a transmit angle $\alpha_0$. In an antenna array, which is one type of antenna that can be configured to have high directivity, the transmit angle is a function of the antenna array weights applied, namely, the direction in which the waves radiated by the antenna elements interfere constructively. A suitable default value $\alpha_0$ of the transmit angle can be determined empirically by considering the received power at the front inter-vehicle transceiver 21; or the suitable default value $\alpha_0$ may be computed from the separation l of the effective antenna locations A, B and their respective heights. For simplicity, FIG. 8A shows the effective antenna locations A, B at equal height.

FIG. 8B illustrates a geometry that results when the pitch component of the articulation angle is increased to a positive value $\theta>0$. The connecting line ACB between the transceivers 21, 121 defines their separation and is thus l units long. If it is assumed that the reflection point R is the ground projection of the articulation point P, then $\angle PCA$ is a straight angle. It follows that the angles $\angle PAC$ and $\angle PBC$ are each $\theta/2$, one half of the pitch component $\theta$ of the articulation angle. The transmit angle of the rear inter-vehicle transceiver 121 may therefore be adjusted as per $$\angle PBC = \alpha_0 + \theta/2.$$

Here, the pitch component ϕ is a signed quantity in the sense that, when the vehicle combination 100 is instead moving through a local minimum of the road elevation, the transmit angle shall be decreased from the default value $\alpha_0$. The derivation of the above control law to be used for ∠PBC is not exact; rather, the inventor has realized that the underlying approximation is well-founded and the control law has satisfactory performance. The transmit angle ∠PAC of the front inter-vehicle transceiver 21 may be adjusted using a similar control law. Alternatively, each of the control laws may be expressed as a lookup table, which indicates for each articulation angle θ a suitable transmit angle ∠PAC or ∠PBC. The suitable transmit angle values may have been determined empirically (e.g., by seeking the angle that maximizes the received power at the corresponding inter-vehicle transceiver) and may optionally be supplemented with interpolated values.

The map-based approach to estimating the articulation angle can be used in alternation with data from an articulation angle sensor. For example, the map information can be used as a fallback data source if the accuracy of the articulation sensor is seen to drop. Alternatively, the map information can be the default data source but be temporarily abandoned if any of the following occurs: a) the map information is locally deficient or missing, b) an online service from which the map information is being retrieved fails to reply, c) the vehicle position becomes unavailable, e.g., as a result of GNSS failure.

Figure 11A:
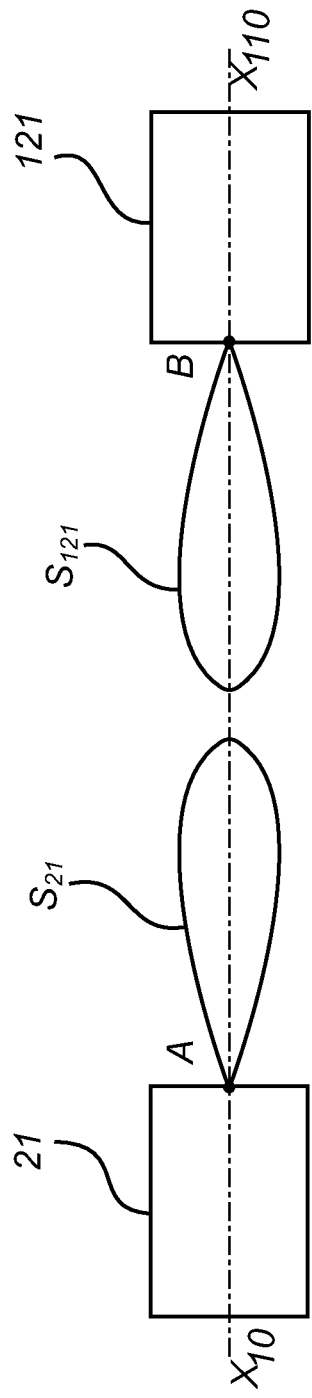
FIG. 11 shows a dependence of the inter-vehicle beam's direction on a yaw component ϕ of the articulation angle.
Figure 11B:
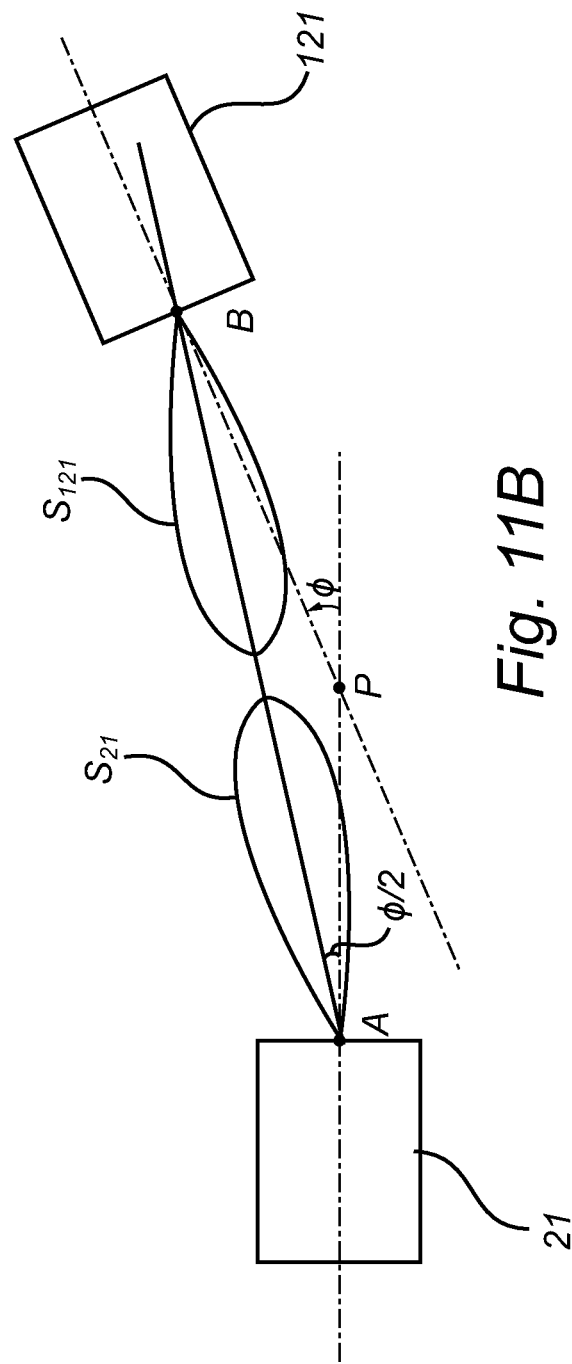

FIG. 11 shows a dependence of the inter-vehicle transceivers' 21, 121 transmit direction on a yaw component ϕ of the articulation angle. The points A, B and P were introduced above in connection with FIG. 8. In FIG. 11A, the vehicle combination is positioned or moving with zero yaw, whereby the horizontal components of the longitudinal axes $X_{10}$, $X_{110}$ of the coupled vehicles 10, no are parallel or collinear. It is assumed that the inter-vehicle transceivers 21, 121 are configured with a default transmit direction which corresponds to zero yaw angle, as illustrated by respective main lobes $S_{21}$, $S_{121}$. If the inter-vehicle transceivers 21, 121 are aligned, the use of the default transmit direction will cause lobes $S_{21}$, $S_{121}$ to align too, and it may be expected that a maximum fraction of the radiated energy will reach the receiving side. In FIG. 11B, the yaw component ϕ of the vehicle combination's 100 articulation angle is positive. Assuming AP≈PB, it follows that the transmit angle shall be adjusted (increased) by approximately half this amount ϕ/2 in order to restore the alignment of the lobes $S_{21}$, $S_{121}$. Therefore, in one embodiment, the transmit angle of the front inter-vehicle transceiver 21 is adjusted according to the following control law:

$$\angle BAP = \frac{\phi}{2}$$

The rear inter-vehicle transceiver 121 may be controlled in a similar manner. These control laws for the yaw component of the transmit direction are valid regardless of whether the inter-vehicle beam reaches the corresponding inter-vehicle transceiver via a straight path or after a ground reflection. Alternatively, the control laws may be expressed as lookup tables populated by empirically determined values, possibly alongside interpolated values.

In one embodiment, the inter-vehicle transceiver 21 is configured to interact with the corresponding inter-vehicle transceiver 121 by backscattering (transponder mode). The backscattered wave may be a radio-frequency wave or an optical wave. For the radio-frequency case, reference is made to section 2.2 of Recommendation ITU-R M.1453-2 "Intelligent transport systems—dedicated short range communications at 5.8 GHz" (2000-2002-2005). In one implementation, the inter-vehicle transceiver 21 uses a carrier wave frequency for which there is no active internal oscillator in the corresponding inter-vehicle transceiver 121. The inter-vehicle transceiver 21 emits an unmodulated carrier signal continuously, which the corresponding inter-vehicle transceiver 121 receives and adopts it as its own carrier signal. In the corresponding inter-vehicle transceiver 121, transmission data (e.g., an identity of the corresponding inter-vehicle transceiver 121 in the further vehicle, measurement data collected by sensors in the further vehicle) may modulate the carrier signal before it is transmitted back towards the inter-vehicle transceiver 21.

In a further development of this embodiment, the backscattered signal is used to perform a distance measurement. For example, the distance may be determined by a time-of-flight calculation on the basis of time of transmission of the carrier signal and the time of receipt of the backscattered signal. The distance may include an orientation component indicative of a relative orientation of the two vehicle units. The distance measurement may be made available to assist a coupling procedure or dock-assist procedure. For example, a coupling procedure is described in applicant's co-pending application EP20198913.4, in which an acoustic sensor (e.g., park-distance control) is used during the vehicle's movement into an approximate coupling position, and a more short-range optical sensor is used to monitor the subsequent maneuvering into an accurate coupling position. The distance measurement based on backscattering described herein may replace the optical sensor or the acoustic sensor, or both of these, in the coupling procedure according to EP2:11.98913.4.

Figure 5:
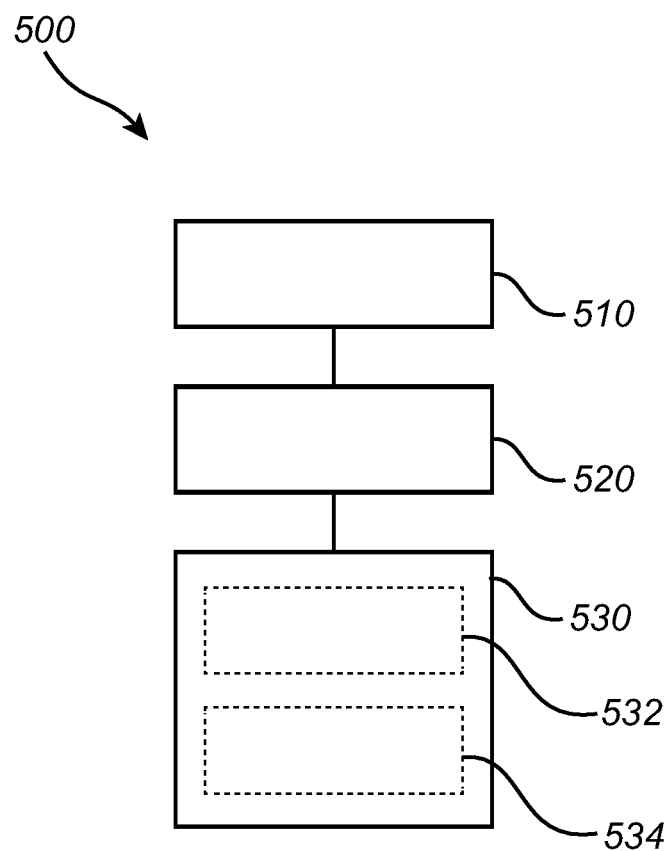
FIG. 5 is a flowchart of a method of operating a vehicle network installed in a vehicle.

FIG. 5 is a flowchart summarizing the functioning of each vehicle network as a method 500.

In a first step 510 of the method, it is detected that the vehicle 10, which is equipped with the vehicle network, is being or has been coupled to a further vehicle 110, to form a vehicle combination Dm. The detection may be in the form of receiving a sensor signal that mechanical, electric, pneumatic etc. connectors have been paired, or by receiving a notification from a processor that an operator has initiated a machine-assisted coupling procedure.

If the first step 510 has been completed, the execution of the method 500 proceeds to a second step 520, in which a communication link 91 from an inter-vehicle transceiver 21 of the vehicle network to a corresponding inter-vehicle transceiver 121 of a vehicle network in said further vehicle 110 is established. The communication link 91 has the effect of joining the two vehicle networks, so that data exchange, resource sharing etc. across the vehicle networks become possible.

For as long as the vehicles 10, 110 remain coupled in the vehicle combination 100 and/or as long as the communication link 91 is considered useful, the communication link 91 is maintained while performing beam adaptation. This third step 530 of the method 500 may include a substep 532 of performing a radio measurement aiming to localize the corresponding inter-vehicle transceiver 121 and using the measurement result to guide the beam adaptation, e.g., in a feedback fashion.

Alternatively or additionally, the third step 530 includes a substep 534 of obtaining an articulation angle ϕ, θ which is used to guide the beam adaptation, e.g., in a feedforward fashion. The articulation angle $\phi$, $\theta$ may be obtained by a direct measurement, an indirect measurement or an estimation approach, as discussed above. In one embodiment, the beam adaptation is further guided by the variability of the location of the corresponding inter-vehicle transceiver (as determined by the radio measurement) or by the variability of the articulation angle $\phi$, $\theta$ (as obtained by the measurement or estimation). In a still further embodiment, the beam adaptation is guided by meteorological data.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A vehicle network in a vehicle, which is couplable to a further vehicle to form a vehicle combination, wherein there is a solid connection between the vehicle and said further vehicle,
the vehicle network comprising an inter-vehicle transceiver configured to communicate with a corresponding inter-vehicle transceiver of a vehicle network in said further vehicle including generating a radio beam connecting the two transceivers,
the inter-vehicle transceiver further configured to perform beam adaptation of the radio beam guided by:
a) radio measurements aiming to localize the corresponding inter-vehicle transceiver, or
b) an articulation angle of the vehicle combination.

2. The vehicle network of claim 1, wherein the inter-vehicle transceiver is configured for radio-based localization on the basis of a data-carrying signal emitted by the corresponding inter-vehicle transceiver.

3. The vehicle network of claim 1, wherein the inter-vehicle transceiver is configured to obtain data indicative of the articulation angle used to guide the beam adaptation from an articulation angle sensor or articulation angle estimator in the vehicle.

4. The vehicle network of claim 3, wherein the articulation angle sensor includes one or more of: a lidar, a radar, a camera, a gyro, an angle sensor, a magnetometer, a Hall sensor.

5. The vehicle network of claim 1, wherein the inter-vehicle transceiver is configured to determine the articulation angle on the basis of map information and a current vehicle position.

6. The vehicle network of claim 5, wherein the map information includes topographical data and the articulation angle includes a pitch component.

7. The vehicle network of claim 5, wherein the inter-vehicle transceiver is configured to select at runtime among alternative articulation angle data sources, including i) an articulation angle sensor and ii) said combination of map information and the current vehicle position.

8. The vehicle network of claim 1, wherein the inter-vehicle transceiver is configured to estimate a variability of a) or b) and to adjust a beam width accordingly.

9. The vehicle network of claim 1, wherein the inter-vehicle transceiver is further configured to perform beam adaptation guided by:
c) meteorological data.

10. The vehicle network of claim 9, wherein the beam adaptation guided by meteorological data includes an adjustment of transmit power and/or beam width.

11. The vehicle network of claim 1, wherein the inter-vehicle transceiver is in non-moving relationship with a frame of the vehicle.

12. The vehicle network of claim 1, wherein the inter-vehicle transceiver is configured to communicate by modulating a radar wave to be emitted by an automotive radar unit.

13. The vehicle network of claim 1, wherein the inter-vehicle transceiver is configured to interact with the corresponding inter-vehicle transceiver by radio-frequency or optical backscattering to perform a distance measurement.

14. The vehicle network of claim 13, wherein the distance measurement is made available for a dock-assist process facilitating the coupling of the vehicle to the further vehicle.

15. The vehicle network of claim 1, wherein the inter-vehicle transceiver is configured to generate a beam reaching the corresponding inter-vehicle transceiver after one ground reflection.

16. The vehicle network of claim 1, wherein the inter-vehicle transceiver is further configured for wirelessly collecting sensor data from nearby sensors in the vehicle.

17. The vehicle network of claim 1, wherein the inter-vehicle transceiver is configured to generate a beam having rapid attenuation with distance and/or high directivity.

18. The vehicle network of claim 1, wherein the inter-vehicle transceiver is configured to transmit the beam at 5 GHz or more.

19. The vehicle network of claim 18, wherein the inter-vehicle transceiver is configured to transmit the beam at 30 GHz or more.

20. A method of operating a vehicle network installed in a vehicle, the method comprising:
detecting that the vehicle is being or has been coupled to a further vehicle to form a vehicle combination, wherein there is a solid connection between the vehicle and said further vehicle;
establishing a communication link from an inter-vehicle transceiver of the vehicle network to a corresponding inter-vehicle transceiver of a vehicle network in said further vehicle including generating a radio beam connecting the two transceivers; and
maintaining the communication link while performing beam adaptation of the radio beam, including one or more of:
a) performing a radio measurement aiming to localize the corresponding inter-vehicle transceiver and guiding the beam adaptation based thereon,
b) measuring or estimating an articulation angle of the vehicle combination and guiding the beam adaptation based thereon.

* * * * *